United States Patent Office 3,439,554
Patented Apr. 22, 1969

3,439,554
STABILIZATION OF SERVOSYSTEM
AGAINST BACKLASH
Rawlins E. Purkhiser, Springfield, N.J., assignor to Air
Reduction Company, Incorporated, New York, N.Y.,
a corporation of New York
Filed May 25, 1967, Ser. No. 641,272
Int. Cl. F16h *19/04*
U.S. Cl. 74—409                                8 Claims

ABSTRACT OF THE DISCLOSURE

A machine of the type which traces a two-dimensional template and moves a tool to reproduce the shape of the template, the machine having a relatively heavy main carriage providing motion in one dimension and a relatively light cross carriage or tool holder movable relative to the main carriage providing motion of the tool in a second dimension, the main carriage being driven by a first servomotor through gearing having significant backlash; the motor having a flywheel rigidly connected to the motor shaft, the moment of inertia of the flywheel being proportioned to provide optimum stability of the servosystem in the presence of the backlash; the tool holder being driven by a second servomotor through gearing, the second motor having a flywheel rigidly connected to the motor shaft, the moment of inertia of the second flywheel being proportioned to adjust the total moment of inertia facing the second motor to provide substantially equal response times in the two motors.

BACKGROUND OF THE INVENTION

(1) Field of the invention

The invention relates to means and methods for stabilizing a servosystem, particularly with respect to the deleterious effects of backlash in gearing, and for equalizing the response times in a servosystem utilizing responses from two or more servomotors.

(2) Description of the prior art

Added inertia, in the form of a flywheel, has in the past been coupled to a servomotor through a variable coupling, for example through slippage and friction or through a spring, in order to increase and decrease stored energy or to apply friction, the adjustment of stored energy or the application of friction being effective only at such times as the motor and flywheel are rotating at unequal speeds, so that increased damping or a change in loading is effective only during transient changes in the rotational velocity of the motor.

It is known also to match the moment of inertia of the load to the moment of inertia of a motor in a servosystem, without consideration of backlash, to provide optimum speed of response.

SUMMARY OF THE INVENTION

In following sharp curves or corners in a template, particularly where the movement of the relatively heavy main carriage must be abruptly halted and the relatively light tool holder suddenly accelerated, or conversely, for example where the main carriage must be accelerated while the tool holder is decelerated, there is bound to be some tracking error which precludes following the contour exactly, the tool either swinging wide at or cutting across a curved contour segment or corner to a greater or lesser extent. A factor in the tracking error is the effect of backlash in the gearing, more particularly in the gearing associated with a rotary motor driving the relatively heavy main carriage. For example, when the motor is still, the backlash may in effect disconnect the motor from its load. When power is then applied to the motor, it runs free, accelerating in inverse proportion to its moment of inertia. Thus, during the period before the gearing takes hold, effectively connecting the motor to the load, the motor attains a certain speed at which it strikes the gearing full force, causing a sudden movement of the tool. During the free running period of the motor, the tool speed is too low, or even zero, and when the motor picks up the load, there may be a period during which the tool speed is too high. In accordance with the invention, inertia is added to the motor by means of the flywheel, providing a minimal load to slow down the acceleration of the motor while running free of the main load, thus softening the blow when the motor strikes the main load and stabilizing the operation of the servosystem.

I have found the flywheel to be most effective in decreasing the motor acceleration when the flywheel is rigidly connected directly to the motor shaft, ahead of any gearing, so that the minimal load is always connected. Spring coupling or frictional slippage interferes with the prompt effectiveness of the flywheel for this purpose. I have found that even if the flywheel is coupled to the motor shaft through a single pair of gears having a one to one gear ratio, the backlash in these gears delays the response of the flywheel so that the flywheel does not provide the desired decrease in acceleration.

If to much moment of inertia is added to the motor shaft the effect is to undesirably slow down the response of the motor to necessary changes in rotational velocity, so that a compromise is required, and I find that there is a critical range of added moment of inertia in which optimum stabilization of the system is obtained.

Stabilization in this manner is advantageous mainly for the motor that moves the relatively heavy load, in this case, the motor for the main carriage. Flywheel stabilization for this purpose will generally not be necessary for the motor that moves the relatively light load. However, due to the considerable unbalance between the moments of inertia of the loads on the two motors, the response time of the two motors will generally be different and this difference is likely to cause the errors of tracking in the respective dimensions to be undesirably unbalanced. To correct this unbalance, I find it desirable to increase the inertial load on the motor driving the lighter member, by means of a flywheel rigidly connected to its shaft, adding sufficient moment of inertia to substantially equalize the response times for the two dimensions of tracking.

The use of a compensating mechanical inertia element is preferred over an equivalent electrical network because when the inertia adjustment is made at the motor shaft, identical amplifiers and associated electrical networks can be used in the servosystems for both motors.

I find that the amount of moment of inertia to be added to the motor driving the main carriage depends upon the amount of backlash in the gearing between the motor shaft and the load. The amount of moment of inertia to be added is conveniently expressed as a percentage of the moment of inertia of the main load as reflected to the motor shaft through the gear train when the main load is connected to the motor shaft by the gear train in the absence of backlash. With servomotors which I have successfully employed in practicing the invention, the optimum percentage is in a range from about 10 to 50 percent. With a specific value of backlash of about one-half degree at the motor shaft with the load held fixed and with a gear reduction ratio of 57.5 to 1, I have had best results with an added moment of inertia of 10 to 20 percent.

DESCRIPTION OF THE PREFERRED EMBODIMENT

Figure 1:
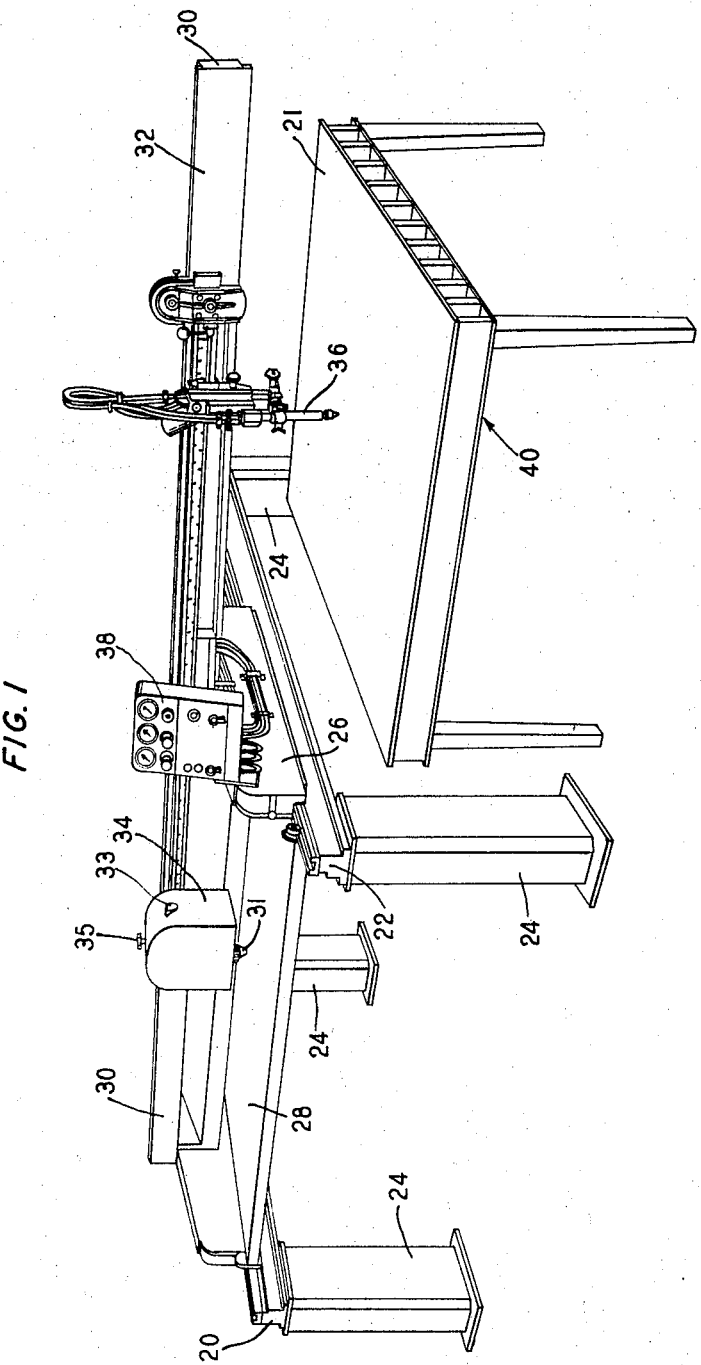
FIG. 1 is a general perspective view of a template copying machine especially designed to cut metal plates to shape by means of cutting torches, which machine is illustrative of a type of machine to which the invention is particularly applicable.

FIG. 1 shows the general structure of an illustrative type of template copying machine to which the invention is applicable. The main track upon which the machine moves comprises rail members 20 and 22 mounted upon pillars 24. A main carriage 26 and a template table 28 are movable independently of each other along the rail members 20, 22, in the direction parallel to the rail members, which direction for reference will be called the Y axis.

Mounted transversely upon the main carriage 26 is a transverse beam 30. Mounted to move along the beam 30 is a transverse carriage 32 which carries a tracing head 34, and one or more tools 36, illustrated as cutting torches. A control panel 38 is shown, mounted upon the main carriage 26, and a cutting table 40 supporting a metal plate 21 to be cut is shown in place below the cutting torches. The direction of motion of the transverse carriage 32 will be called, for reference, the X axis.

The tracing head 34 contains known means for energizing servomotors for driving the main and transverse carriages, for coordinating the speeds of the servomotors so as to determine the direction of motion of the tools, for selecting a desired tracing speed, and for tracing a line or edge of a template positioned on the template table 28.

In the figure, there are indicated on the tracing head 34 a tracing sensor 31, a tracing speed selector knob 33, and a manual steering knob 35.

Figure 2:
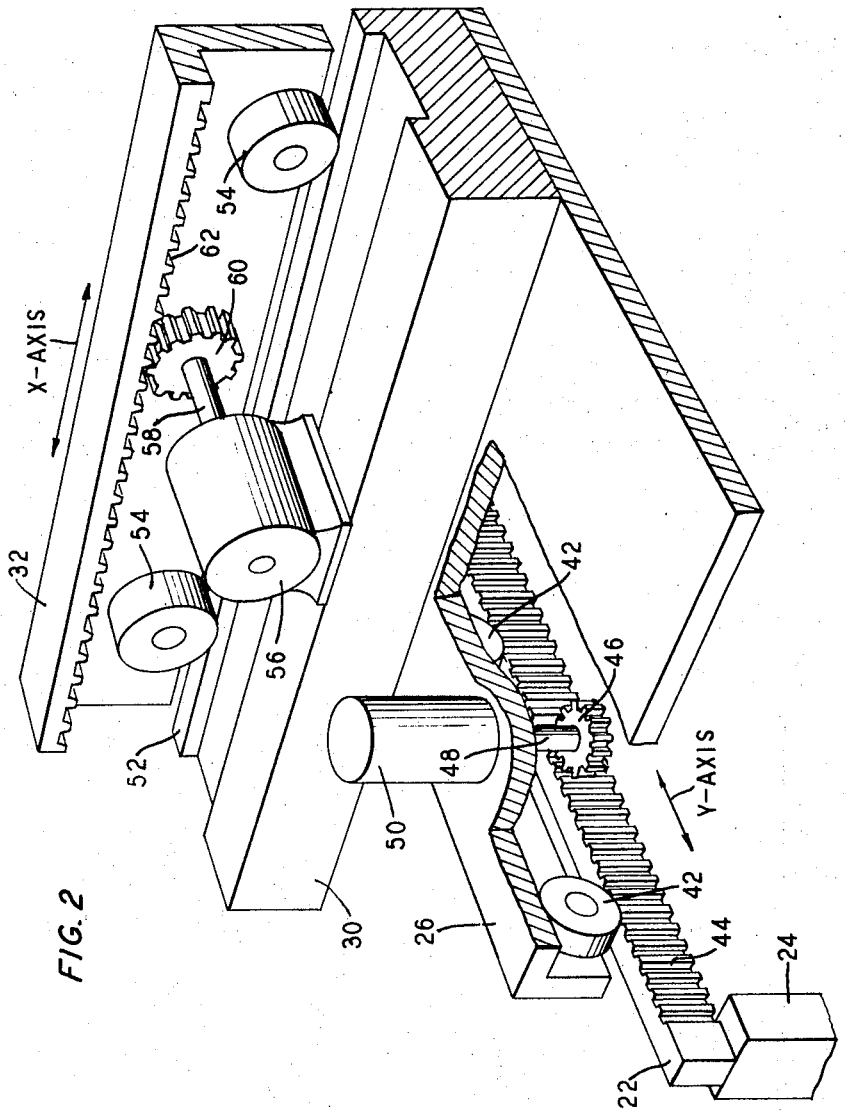
FIG. 2 is a diagram representing in perspective, partly in section, the relationship between a main carriage and a cross carriage together with means for driving each said carriage.

FIG. 2 shows in schematic manner the driving mechanism for the main carriage 26 and for the transverse carriage 32. The main carriage 26 is provided with wheels 42 which ride along a track on the upper surface of the rails 20, 22. For clarity in the drawing only one rail, 22 is shown. Compared with FIG. 1, the apparatus is viewed from the rear, whereby right and left are interchanged, in FIG. 2, in order to show the location of the driving means. In general, cutting machines will vary in design and in the location of the driving means, the machine shown being merely illustrative.

A rack gear 44 is provided on a side face of the rail 22 with which is enmeshed a pinion gear 46 on a shaft 48 driven by a motor 50. For clarity in the drawing, reduction gearing which will normally be employed between the motor 50 and the pinion 46 is omitted. The motor 50 serves to propel the main carriage along the rails 20, 22.

The transverse beam member 30 is attached to, or integral with, the main carriage 26 and is provide with a track portion 52 to accommodate the transverse carriage 32, which latter is mounted upon wheels 54. The transverse carriage 32 is driven by a motor 56 attached to the beam 30, driving a shaft 58 and a pinion gear 60, which latter meshes with a rack gear 62 attached to, or integral with, the carriage 32.

It will be noted that the motor 50 drives the entire mass including the main carriage 26, the transverse rail 30, and the transverse carriage 32, while the motor 56 drives only the mass of the transverse carriage 32.

Figure 3:
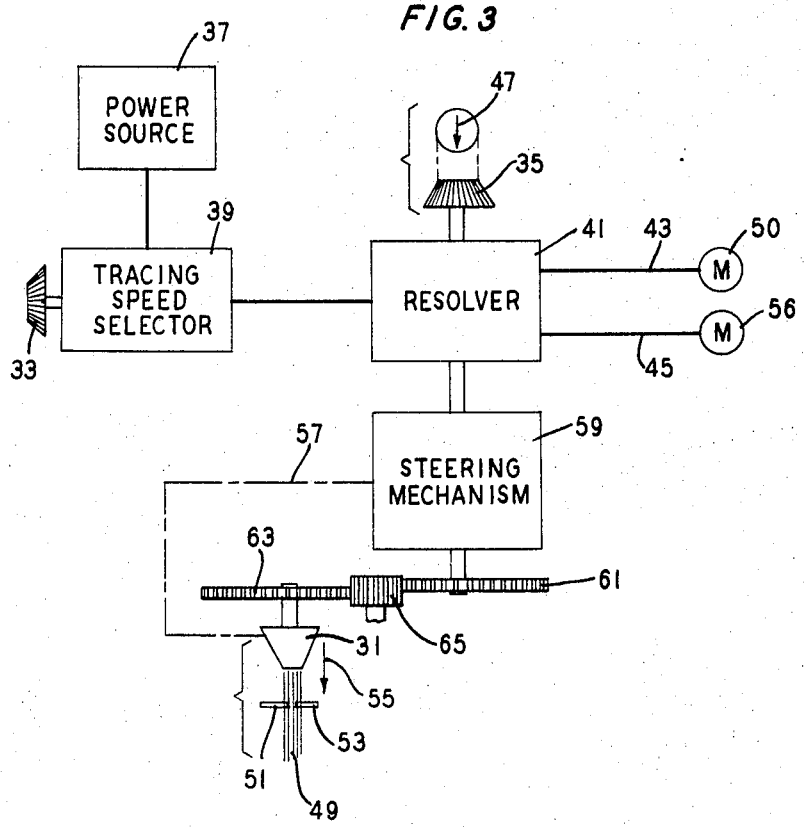
FIG. 3 is a schematic diagram of illustrative means for driving the machine shown in FIGS. 1 and 2 in two dimensions at a selected speed under the control of signals developed by a tracing head guided by a line or edge in a template.

FIG. 3 shows schematically the manner in which the components of the tracing head 34 operates to control the motors 50 and 56 to cause the machine to trace a line or edge of the template.

The power for operating the motors 50 and 56 is furnished by a power source 37 connected through a tracing speed selector 39 and thence through a resolver 41 through separate supply paths 43 and 45 to the respective motors 50 and 56. The tracing speed selector knob 33 controls the amount of power passed from the power source 37 through the tracing speed selector 39 to the resolver 41 to determine the total current delivered to the two motors 50 and 56. The resolver 41 divides this current between the motors 50 and 56 in the proper proportion to drive the machine, including the tracing head 31 in the direction indicated by the angular orientation of the resolver 41. This direction is shown by an arrow 47 on the manual steering knob 35.

The template, illustrated as a band 49, may be scanned by photoelectric scanning means represented by rectangles 51 and 53 constituting sensitive areas sensed by the sensor 31. When the sensor 31 is on line, the rectangles 51 and 53 are symmetrically disposed with respect to the center of the band 49. The motion of the sensor 31 is along the central axis of the band 49 as indicated by an arrow 55 which is parallel to the arrow 47 on the manual steering knob 47. When the band 49 deviates from the direction of the arrow 55, one of the rectangles 51 or 53 covers more of the width of the band 49 than the other. The result is that the sensor 31 sends a command signal over a path indicated schematically by a broken line 57 to a steering mechanism 59 which is rotatable as a unit with the resolver 41 and the knob 35. The command signal carries the sense of the deviation of the band 49 from the direction 55, and serves to cause the steering mechanism 59 to rotate in such sense as to steer the sensor 31 back toward the central position in the band 49. Gears 61, 63 and an idler 65 connect the steering mechanism 59 with the sensor 31 to effect the correction of the pointing of the sensor 31. The rotation of the resolver 41 changes the relative speeds of the motors 50 and 56 to steer the machine as a whole in such manner as to properly trace the template.

It will be evident that a tracing system which follows an edge, for example between a white area and a black area, of a template, may be substituted for a tracing system which follows a band or line.

The cutting machine operates generally in known manner, which briefly stated is as follows. Assuming that the tracing sensor 31 is centered over the line or edge to be traced, and that the speed setting knob 33 has been set for a desired tracing speed, the steering mechanism, to which the manual steering knob 35 is attached, sends command signals to the respective motors 50 and 56 through the resolver 41 to cause each motor to rotate at the necessary speed to move the machine along the line or edge at the selected speed. When the line or edge in the neighborhood of the tracing sensor 31 changes direction, the sensor 31 detects an off-line condition and also detects the direction of the change. On the basis of the change detected, the sensor sends command signals to the steering mechanism 59 to turn the steering mechanism back toward the line or edge being traced. By constant correction, the steering mechanism acts as if locked upon the line or edge and thus traces the line or edge, in known manner.

To place the sensor 31 initially on the line or edge to be traced, the steering mechanism 59 may be manually operated by turning the manual steering knob 35. The arrow 47 on the knob 35 enables the operator to direct the sensor along any convenient path to place it upon the line or edge. During this preliminary movement of the machine, the tools 36 are not operated, but are brought into action when the sensor has been placed at a point on the line or edge and has been headed in the direction of the line or edge.

Other known methods of leading the sensor 31 onto the template for starting a cut may be used instead of the above described method.

Figure 4:
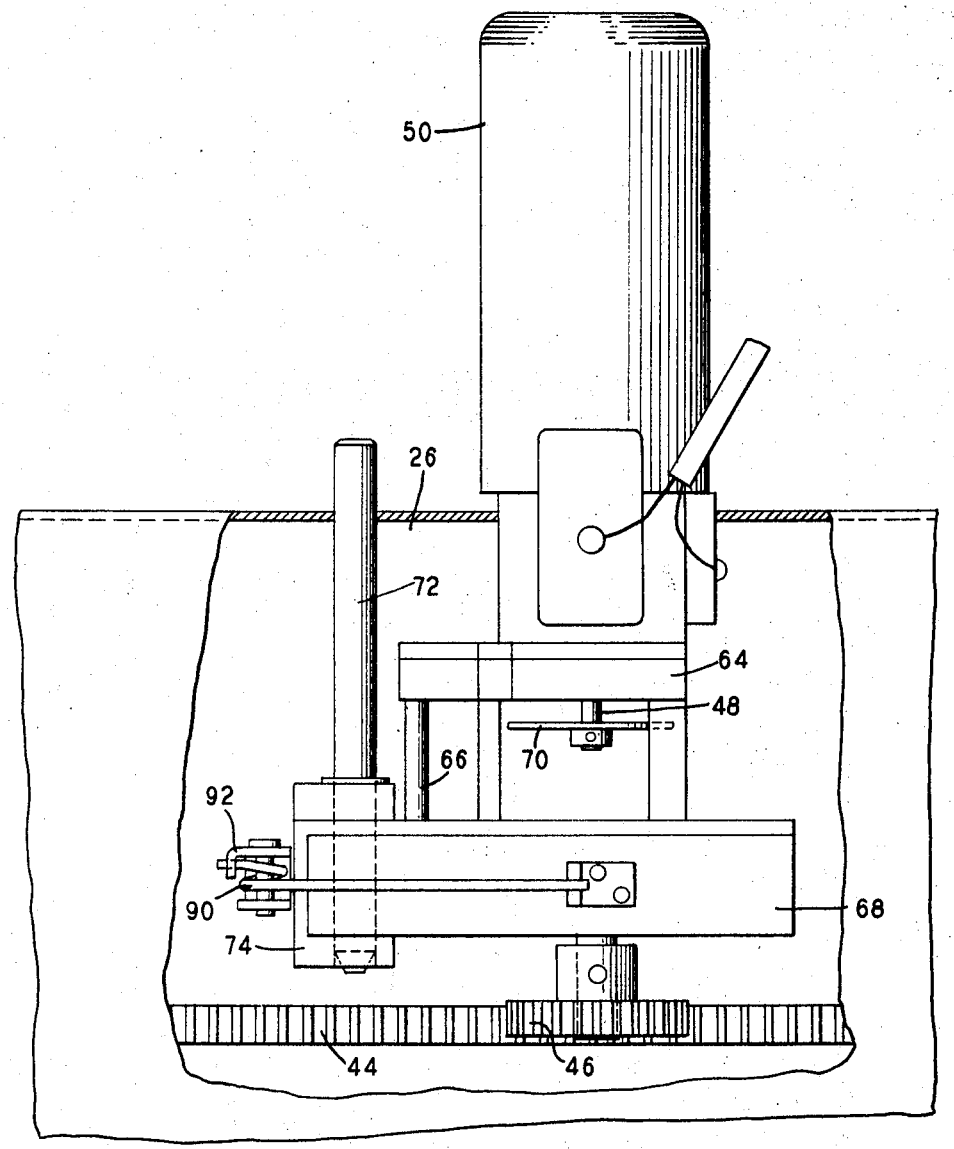
FIG. 4 is an elevational view of a servomotor and gearing for driving the main carriage of the machine shown in the preceding figures and embodying a flywheel in accordance with the invention.

FIG. 4 shows an illustrative form of the Y-axis motor 50 and connected drive means engaging the rack gear 44. The direct drive utilizing the shaft 48 shown in FIG. 2 is replaced by a first stage gear box 64, connected through an intermediate shaft 66 and a second stage gear box 68 to the pinion gear 46. The motor shaft 48 drives the gearing in the first stage gear box 64 and in addition drives a flywheel 70, rigidly connected directly to the shaft 48, the flywheel being utilized in accordance with the invention.

To provide resiliency in the engagement between the pinion gear 46 and the rack gear 44, the entire motor and gear assembly is shown mounted on a pivot 72 held in a bracket 74 attached to the body of the main carriage 26, and spring pressed into engagement by means of a helical compression spring 90 confined between the gear box 68 and a bracket 92 attached to the main carriage 26. This resilient engagement serves to reduce or substantially eliminate backlash between the pinion gear 46 and the rack gear 44, by continually urging the pinion gear into contact with the rack gear.

Figure 5:
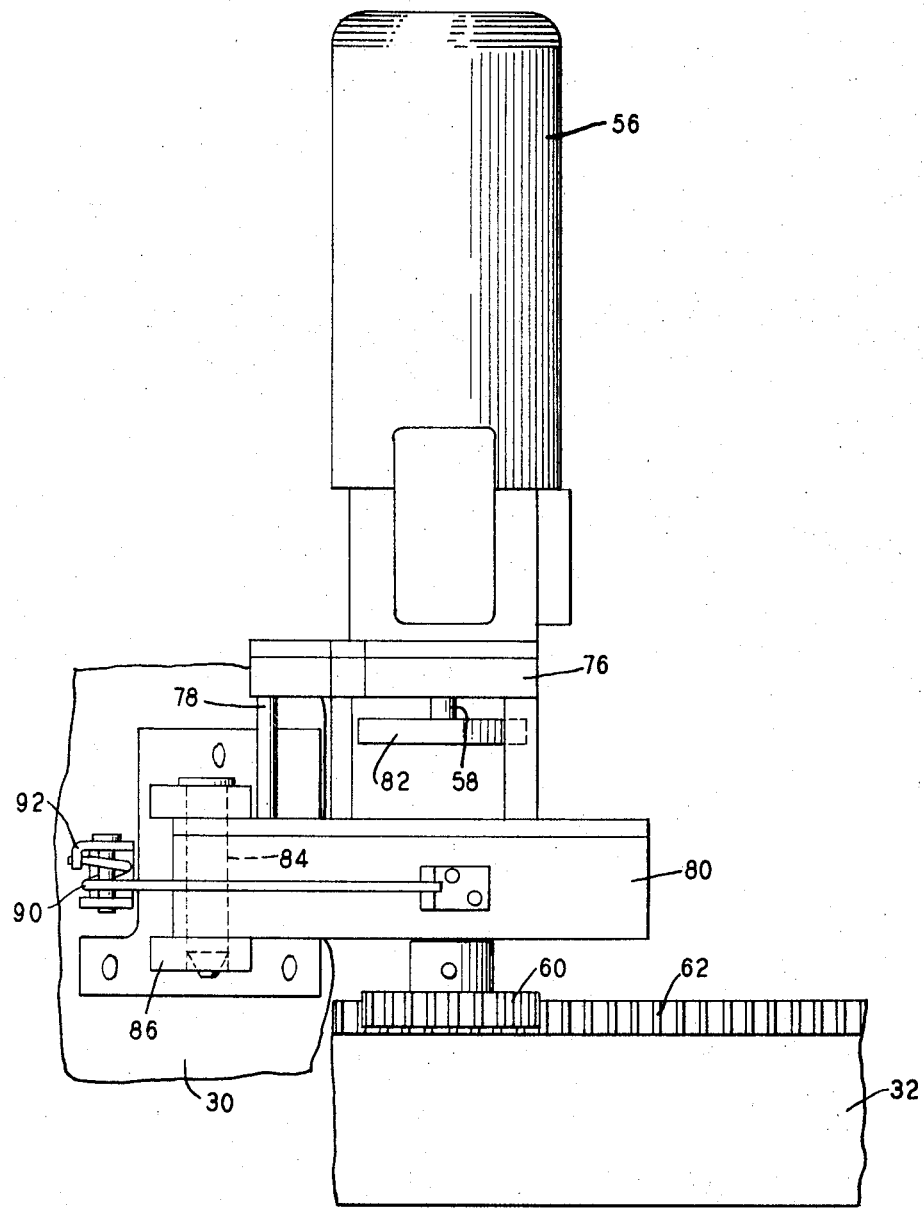
FIG. 5 is a plan view of a servomotor and gearing for driving the cross carriage of the machine and embodying another flywheel in accordance with the invention.

FIG. 5 shows an illustrative form of the X-axis motor 56 and connected drive means engaging the rack gear 62. The direct drive shown in FIG. 2 is replaced by a first stage gear box 76, connected through an intermediate shaft 78 and a second gear box 80 to the pinion gear 60. The motor shaft 58 drives the gearing in the first gear box 76 and in addition drives a flywheel 82, rigidly connected directly to the shaft 58, the flywheel having a useful function in accordance with the invention.

Between the pinion gear 60 and the rack gear 62 there is shown a resilient connection similar to that shown in FIG. 4 between the pinion gear 46 and the rack gear 44, for the same purpose of reducing or substantially eliminating backlash between the pinion gear and the rack gear. In FIG. 5, the entire motor and gear assembly is mounted upon a pivot 84 in a bracket 86 supported on the transverse beam 30. In this case, the helical compression spring 90 is confined between the gear box 80 and a bracket 92 mounted at a suitable point on the transverse beam 30.

To facilitate an understanding of the invention it will be useful at this point to derive a formula for the apparent moment of inertia of a given load upon a motor as the load is seen at the motor shaft, having been reflected or transformed by the action of gearing, e.g. speed reduction gearing, inserted between the load and the motor shaft.

Given a mass $m$ moved on a rack at a translational velocity $v_1$ by a motor running at a rotational velocity $w_2$ connected through reduction gearing driving a pinion shaft at a rotational velocity of $w_3$ which in turn drives a pinion of radius $r_1$ which in turn drives the rack, the kinetic energy of the mass is $$K_1 = \tfrac{1}{2} m v_1^2 \tag{1}$$

viewed at the shaft of the pinion, and neglecting the added kinetic energy of the pinion and shaft, the kinetic energy of the combination is $$K_3 = \tfrac{1}{2} I_3 w_3^2 = \tfrac{1}{2} m v_1^2 \tag{2}$$

where $I_3$ is the moment of inertia of the loaded pinion viewed at the motor shaft, and neglecting the added kinetic energy of the motor shaft and of the reduction gearing, the kinetic energy of the system is $$K_2 = \tfrac{1}{2} I_2 w_2^2 = \tfrac{1}{2} m v_1^2 \tag{3}$$

where $I_2$ is the moment of inertia of the loaded motor shaft.

Using the known relationship between translational velocity at the circumference of the pinion and the rotational velocity of the pinion shaft $$v_1 = r_1 w_3 \tag{4}$$

it follows that $$K_2 = \tfrac{1}{2} I_2 w_2^2 = \tfrac{1}{2} m r_1^2 w_3^2 \tag{5}$$

and, $$I_2 = m r_1^2 \frac{(w_3)^2}{(w_2)^2} \tag{6}$$

The Equation 6 was applied to a certain cutting machine in which it was desired to use the invention in order to stabilize the servosystem. The weight $m$ was 1000 pounds (16,000 ounces), being the combined weight of the main carriage 26, the transverse beam 30, the transverse carriage 32, and all parts carried by these members. The radius $r_1$ of the pitch circle of the pinion gear 46 moving the weight $m$ was 1.25 inches. The ratio between the rotational velocity of the motor 50 and the rotational velocity of the pinion gear 46 was 57.5 to 1. Using these values in Equation 6, the moment of inertia of the cutting machine viewed at the shaft of the motor 50 was calculated to be 7.5 ounce-inches-squared. By experiment it was found that the optimum moment of inertia in the flywheel 70 driven by the Y-axis motor 50 was about 10 percent of the moment of inertia calculated above, that is, 0.75 ounce-inches-squared. This amount of moment of inertia was provided by a cylindrical brass flywheel 2.5 inches in diameter and 0.04 inch thick.

In any given machine there is found to be an optimum value of moment of inertia for the flywheel, generally in the range from 10 to 20 percent of the moment of inertia viewed by the Y-axis motor. The optimum in any case is not likely to exceed 50 percent. In the cutting machine to which the invention was applied, the weight moved by the X-axis motor 56 was 300 pounds. In order to equalize the operating conditions of the Y-axis and X-axis motors it was necessary to add effectively 700 pounds to the load of the X-axis motor. This was done by means of the flywheel 82. More exactly, the Y-axis motor was facing 7.5 plus 0.75 ounce-inches-squared, or 8.25 ounce-inches-squared, with a load of 1000 pounds. To add 700 pounds to the apparent load of the X-axis motor required 0.7 times 8.25 ounce-inches-squared or 5.78 ounce-inches-squared, in the flywheel 82. This was provided by means of a brass cylinder 2.5 inches in diameter and 0.31 inch in thickness.

While the invention has been illustrated as applied to a cutting machine employing cutting torches such as cutting torches for cutting metal plates, it will be understood that the invention may also be applied to other kinds of machines wherein a heavy carriage is driven by a servomotor, or where motion is provided in two dimensions making it desirable to equalize the responses of two servomotors.

I claim:

1. Apparatus comprising a main carriage movable in a first direction and supporting a secondary carriage, said secondary carriage being movable in a second direction and supporting a relatively small portion of the weight supported by said main carriage, said main and secondary carriages adapted to move respective loads, individual motors for moving the respective carriages and first inertia means associated with the shaft of the motor for moving the second carriage to increase the moment of inertia of the load moved by said second carriage thereby to substantially equalize the moments of inertia of the respective loads.

2. Apparatus in accordance with claim 1 wherein said first inertia means comprises a flywheel rigidly connected directly to the shaft of the motor for moving the second carriage.

3. Apparatus in accordance with claim 1 together with second inertia means associated with the shaft of the motor for moving the main carriage to provide a minimal load for said main carriage motor in case of temporary effective disconnection of the motor from the main carriage.

4. Apparatus in accordance with claim 3 wherein said second inertia means is a flywheel connected directly to the shaft of the motor for moving the main carriage.

5. The method of controlling the multi-directional movement of an element in response to signals from a sensor comprising the steps of supporting said element in fixed relation to a first relatively light carriage movable in a first direction, supporting said relatively light carriage on a relatively heavy carriage movable in a second direction, moving said light carriage by means of a first motor, moving said heavy carriage by means of a second motor, and adding a constant load to said first motor to equalize the response times of said first and second motors to said signals from said sensor.

6. The method as recited in claim 5 further comprising the step of adding a constant load to said second motor to provide a minimal load for said second motor in case of temporary effective disconnection of said second motor from said heavy carriage.

7. In a template copying device, in combination, a main carriage supporting the principal components of said device, a secondary carriage supporting a relatively small portion of the total weight supported by said main carriage, individual rotary motors for moving the respective carriages, and a flywheel rigidly connected directly to the shaft of the motor for moving the secondary carriage to increase the moment of inertia of the load moved by said secondary carriage thereby to substantially equalize the moments of inertia of the respective loads.

8. Apparatus in accordance with claim 7, together with a second flywheel connected directly to the shaft of the motor for moving the main carriage to provide a minimal load for said motor in case of temporarily effective disconnection of said motor from the main carriage.

References Cited

UNITED STATES PATENTS

| | | | |
|---|---|---|---|
| 2,480,634 | 8/1949 | Dawson | 74—574 X |
| 2,516,698 | 7/1950 | Hall | 74—574 X |
| 3,022,433 | 2/1962 | Ferranti | 74—572 X |
| 3,168,838 | 2/1965 | Simon et al. | 74—388 |

DONLEY J. STOCKING, *Primary Examiner.*

L. H. GERIN, *Assistant Examiner.*

U.S. Cl. X.R.

74—432, 572